Aug. 16, 1927.
W. T. HENSLEY
SPLIT PULLEY
Filed Feb. 25, 1924
1,639,502
4 Sheets-Sheet 1
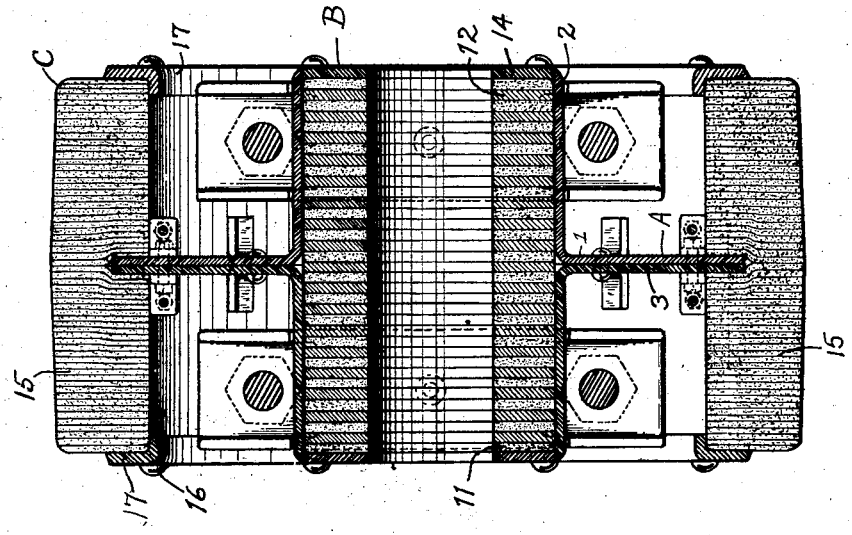
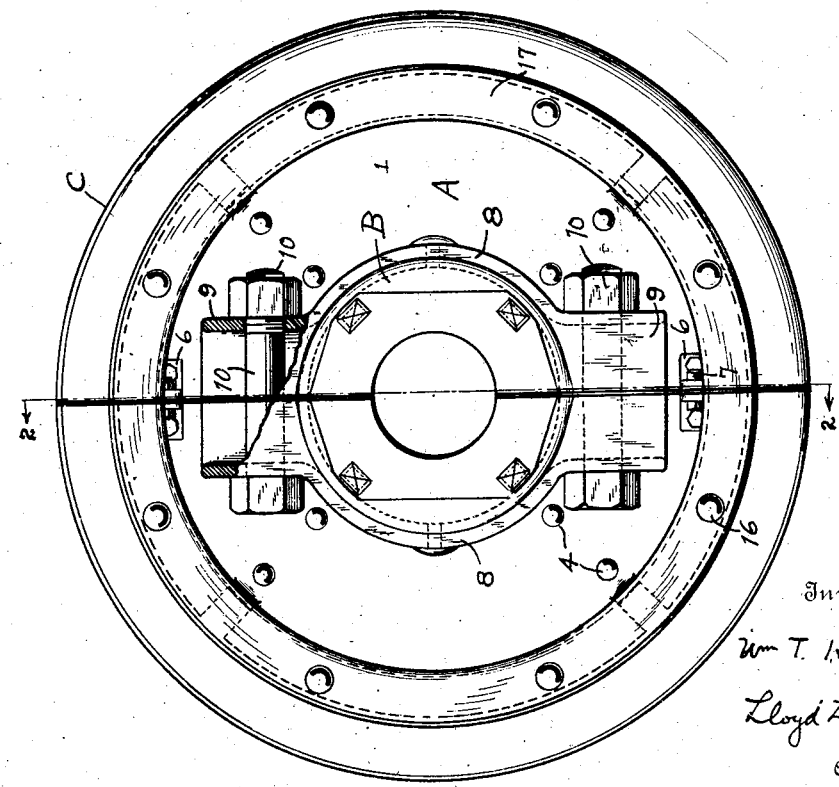
Inventor
Wm T. Hensley
Lloyd L. Evans
Attorney Aug. 16, 1927.
W. T. HENSLEY
1,639,502
SPLIT PULLEY
Filed Feb. 25. 1924
4 Sheets-Sheet 2
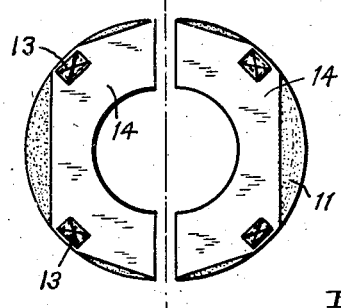
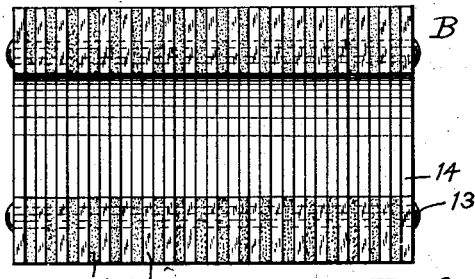
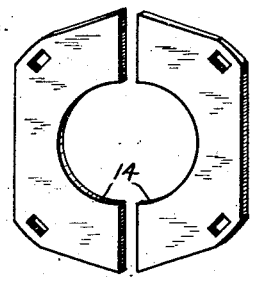
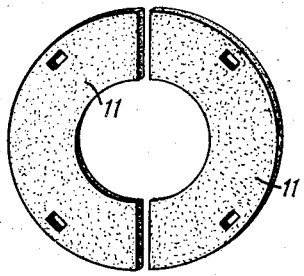
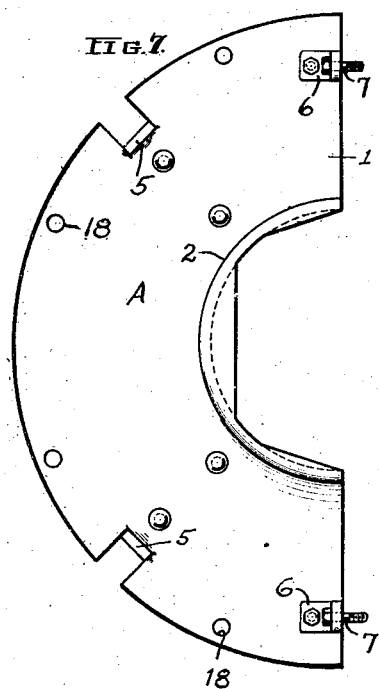
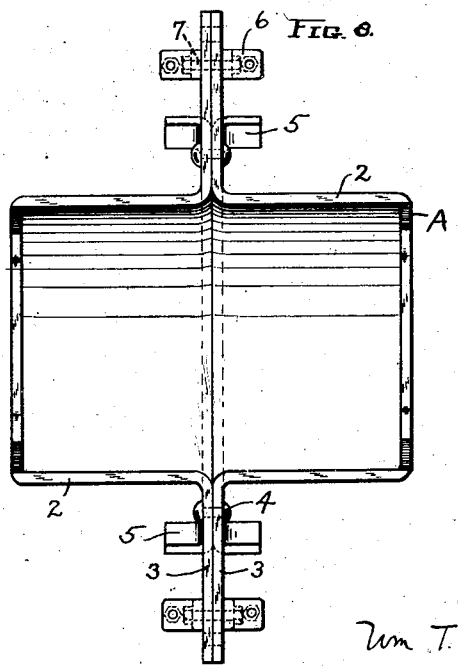

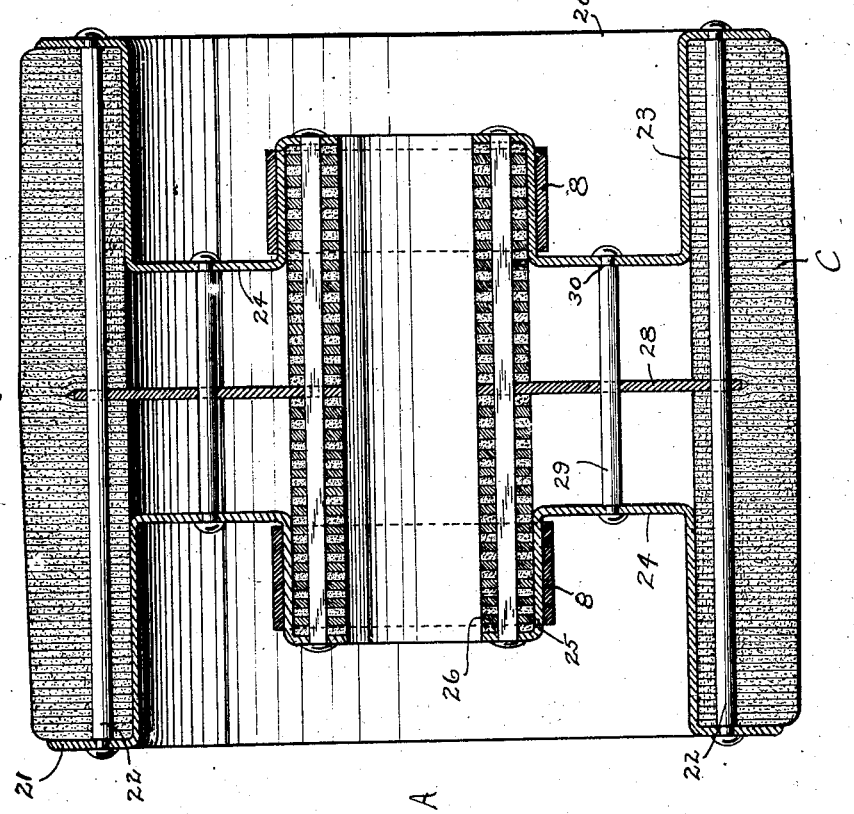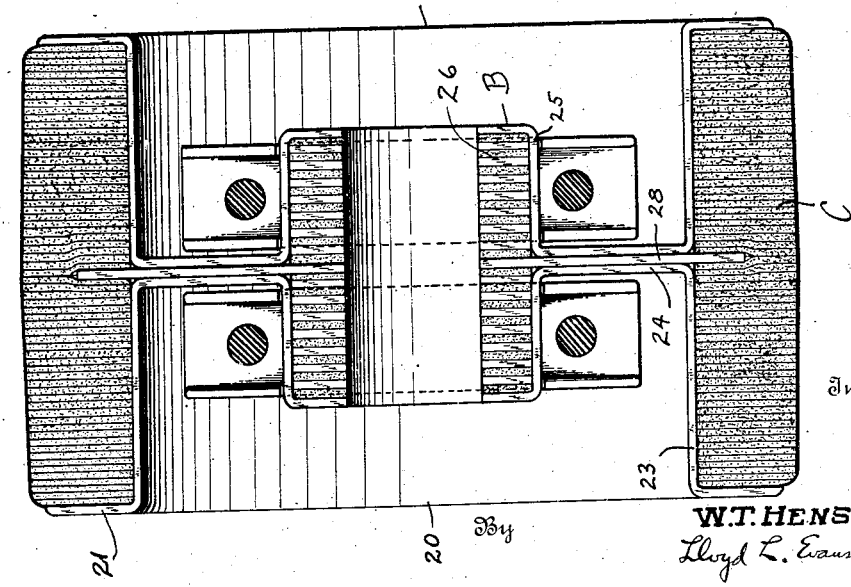

Aug. 16, 1927.  W. T. HENSLEY  1,639,502
SPLIT PULLEY
Filed Feb. 25, 1924   4 Sheets-Sheet 4

Inventor
W. T. HENSLEY.
Lloyd L. Evans
By                Attorney

Patented Aug. 16, 1927.

1,639,502

UNITED STATES PATENT OFFICE.

WILLIAM T. HENSLEY, OF INDIANAPOLIS, INDIANA.

SPLIT PULLEY.

Application filed February 25, 1924. Serial No. 695,001.

This invention relates to relatively large split pulleys having laminated rims and includes those pulleys which are of sufficient diameter that it is preferable to have rim and hub portions with an intervening web portion.

An object of the present invention is to provide a split pulley of the same general characteristics as the solid pulley of the web type shown in my copending application, Serial No. 695,002. Such a pulley may be provided with a relatively dense hub portion possessing great durability and mechanical strength and with a laminated rim portion possessing the requisite mechanical strength, but having to a high degree the frictional qualities desirable in frictional power transmitting elements.

A further object of the invention is to provide a construction of metal end members so formed that they may clamp hub core and laminated rim members of different dimensions between them, so that the end members may be standard for pulleys of substantially the same diameter but of various widths of face.

It is also an object of the invention to provide a pulley of the type above described in which the parts can be economically manufactured and quickly and easily assembled to form a complete pulley.

The pulley structure disclosed in the above application is particularly well suited to the formation of split pulleys and the present invention has for its object to provide a laminated split pulley by cutting a laminated pulley, such as disclosed in said application, in two parts along an axial plane and providing suitable means for rigidly securing the two parts of the pulley together.

Reference should be had to the accompanying drawings forming a part of this specification, in which Figure 1 is a side elevation of a pulley embodying the invention.

Fig. 2 is a section taken on line 2—2, Fig. 1.

Fig. 3 is an end elevation of the divided hub core.

Fig. 4 is a side elevation of a section of the core viewed as indicated by the line 4—4, Fig. 3.

Fig. 5 is a perspective view of one of the divided end plates.

Fig. 6 is a perspective view of one of the divided plates forming the laminæ of the core.

Fig. 7 is a side elevation of one of the half plates employed in the sheet metal body of the pulley.

Fig. 8 is a face view of the halves of the sheet metal body of the pulley secured together.

Fig. 9 is a sectional view taken on line 9—9, Fig. 11, and shows a modified form of pulley embodying my invention.

Fig. 10 is a sectional view of a modified form of pulley having widened rim and hub core parts, the end view of this form of pulley being the same as the end view of the modified form of pulley shown in Fig. 9 and Fig. 11 and the section being taken on a line corresponding in position to line 10—10 of Fig. 11.

Figure 11:
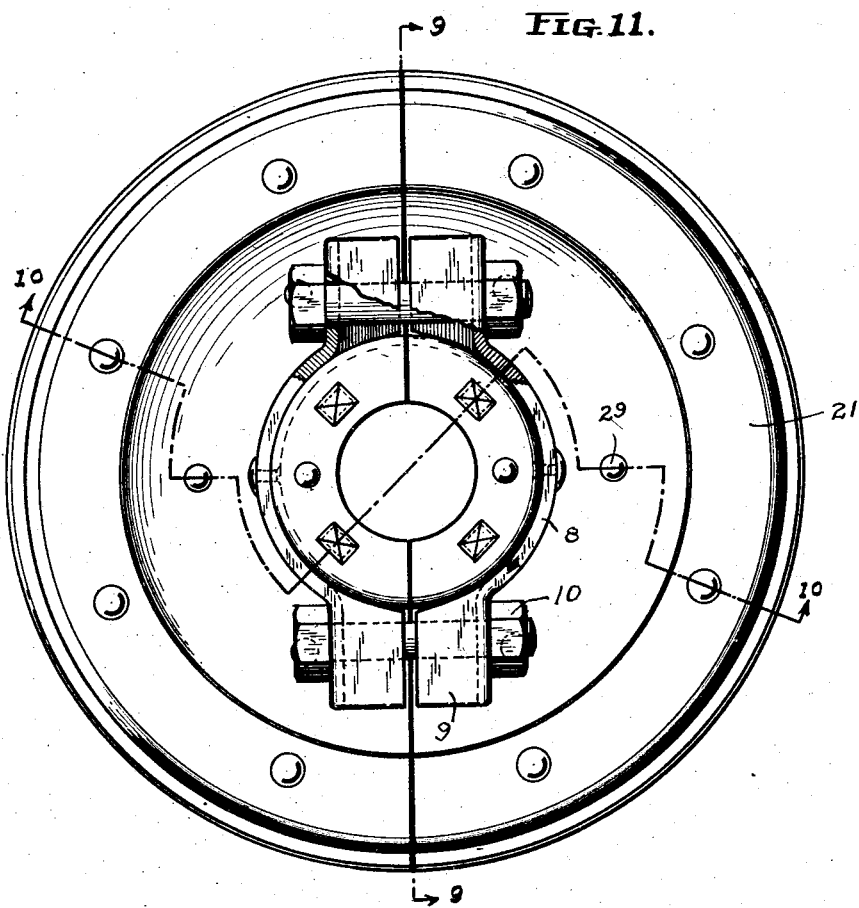
Fig. 11 is an end elevation of the modified form of my pulley shown in Fig. 9.

Referring to the accompanying drawings which show a pulley embodying the present invention, the pulley is built up upon a sheet metal body or shell, indicated generally by the reference character A, the body A being constructed to enclose a hub core indicated generally by the reference character B and forming the support for a laminated rim, indicated generally by the reference character C.

As shown in Figs. 1 and 2, the sheet metal body is formed by a pair of stamped sheet metal disks secured face to face and both the core B and rim C are formed by laminæ in the form of annular plates arranged face to face, and all lying in planes at right angles to the axis of the pulley, the plates of the hub core and rim being concentric with each other and with the body of the pulley. In accordance with the present invention, the pulley is cut in two on an axial plane to form a split pulley and, by reason of the concentric and parallel arrangement in planes normal to the axis, the parts of the pulley are divided into identical halves, the laminæ of the rim and core and the disks of the body being so secured together that the halves thereof form rigid units.

The sheet metal body A, as shown in Figs. 1 to 4, consists of two identical disks 1, the central portions of which are drawn to form cylindrical walled cups 2 which, when the disks are secured together, form the hub casing to receive the hub core B. When the flat outer portions 3 of the disks are secured together, they form the web of the pulley lying in the central plane of the pulley, rivets 4 being employed to secure the disks together. At intervals around the periphery thereof the outer portions 3 of the disks have integral tongues 5 struck up therefrom and bent at right angles thereto to engage and support the laminated rim C. The body A is cut in two along an axial plane so that the halves are substantially identical, and to secure the halves together angle clips 6 are secured to the portions B of each of the halves near the opposite ends of the severed diametrical edge and have their outwardly projecting flanges so positioned that their outer faces lie substantially in the plane of the severed edge. When the halves are assembled, the clips 6 of opposite halves abut face to face and are secured together by bolts 7.

Additional means for securing the halves of the body together consists of clamping members 8 which have arcuate central portions riveted to the separate halves of the cylindrical cups 2 and projecting end portions 9, the inner faces of which lie substantially on the dividing plane so that when the halves are assembled the portions 9 of the two clamping members 8 abut. The clamping members 8 are preferably in the form of sheet metal stampings, the projecting portions 9 being of channel form, the flanges of the channels abutting edge to edge when the halves of the body are assembled. The projecting channel portions 9 of the clamping members are secured together edge to edge by means of bolts 10 and thus clamp the pulley halves tightly to the bushing (not shown) usually interposed between a split pulley and the shaft.

The hub core B may be made up of disks or plates of fibrous material, such as paper, strawboard and the like, or may comprise metal plates, or both fibrous and metal plates alternated in any desired manner. In the formation of the core, the various plates may be assembled, pressed and riveted to hold them in compressed condition. When fibrous plates are used, they are preferably compressed sufficiently to substantially increase their density for engagement with a shaft.

The plates 11 and 12 may be formed with rectangular openings and assembled on rectangular rivets 13 which, after compressing the core, are headed over upon end plates 14 to rigidly bind the core together. The end plates 14 are polygonal in shape and are cut from the bottom portions of the cups 2 of the disks. When the core is assembled within the hub casing of the body, these end plates fit in the openings from which they were cut and serve to position the core with respect to the body and to prevent relative rotation between the core and body. When the core B is severed on a diametrical plane, each half thereof is rigidly held together by the rivets 13 passing therethrough, so that there is no appreciable loss of strength due to the dividing of the core.

The laminated rim C is secured upon the periphery of the disks 1 which form the body of the pulley and is made up of a series of laminations of fibrous material, which may comprise disks or annular laminæ of any desired length. For instance, each annular piece may be relatively short or may be of a length equal to or greater than one circumferential dimension. Whether short or long, they may overlap or have their ends substantially abut each other, as desired. Or the rim may be made up from a single strip of fibrous material spirally wound into an annular, cylindrical form. As the rim is made up in any of the above ways, the annular laminæ may have a suitable binder, such as casein glue or sodium silicate, applied to the surface, and the assembly may be compressed to the proper density to make a one-piece rim unit. Rivet holes may be provided in the rim unit to receive the rivets 16.

Reinforcing annular rings 17 are provided, and the rivets 16, which pass through the rim and rings, may be headed over upon the outer faces of the rings 17. The rivets 16 also pass through the apertures 18 near the periphery of the disks 1 and thus rigidly secure the rim C in place upon the rim of the pulley. It will be seen that the annular rings 17 are of less radial dimension than the laminæ forming the rim C, so that pressing the rings 17 toward each other will compress the inner portion of the laminæ more than the outer portion, thus leaving the outer portion less dense and relatively soft.

When divided upon an axial plane, each half of the rim C is rigidly held together by the half rings and rivets connecting them. By reason of the rigid construction, the divided rim is not materially weakened, and when the halves of the pulley are secured together by the bolts 7 and 10, the pulley so formed is substantially equal in strength to a unitary pulley, and is adapted to be clamped about a bushing upon a shaft in the ordinary manner without dismantling the mechanism with which the shaft is associated.

In the embodiment of my invention shown in Figs. 9 to 11, the metal end members 20 are cup-shaped and provided with outturned flanges 21 to which the rim C is secured by any suitable means, such as rivets 22. The annular walls 23 of the cup-shaped members 20 underlie the rim C throughout their length. The bottoms 24 of the members 20 are provided with inverted cups therein which form the hub 25 to receive the hub core 26.

It will be noted in this form of the invention that the portions 24 of the members 20 may be secured together in any suitable manner and as shown in Fig. 9 the intermediate plate 28 may be interposed between the members 20 and extend outwardly to engage the rivets 22 of the rim and thus reinforce and strengthen the pulley.

When pulleys are desired with a greater width of face, the members 20 may be spaced as shown in Fig. 10 and riveted together with rivets 29 having shoulders 30 against which the web portions 24 are seated, and the rivets then headed over. It is obvious, of course, that any suitable clamping means to hold the members 20 rigidly and yet hold them spaced apart would suffice. In this form the plate 28 may also be employed and be disposed centrally.

Also, in this form of the invention it will be noted that the hub core is directly riveted to the hollow hub portions 25 of the metal members 20 because in this form the hub core, rim and end plates 20 may be assembled and then compressed and riveted in one operation. It is, therefore, unnecessary to form the hub core as a separate unit first, although it is obvious that this may be done if desired and certain apertures left through the core and hub portions through which rivets may be inserted to be headed during or after the pressing operation, so that the core will be rigidly secured to the hub casing 25.

The hub core 26 may be of any suitable construction such as a solid piece of metal, but preferably it is laminated as shown in the drawing and comprises metal or fibrous laminæ, or both metal and fibrous laminæ alternated in any desired manner or as indicated in Figs. 9 and 10.

It will thus be seen that I have provided a pulley for power transmission having a laminated hub portion which may be readily secured to a shaft to rotate therewith, and having an outer laminated rim portion for engagement with a belt or other power transmitting device, and that both of these portions are connected by a relatively strong web portion. Thus I have produced a relatively cheap pulley of this type not having the usual cast iron or solid metal hub, and which also has a relatively light but strong rim portion having a maximum frictional surface.

While I have shown a laminated rim and prefer such a rim, it is of course obvious that the construction of my pulley lends itself easily to the use of any rim which can be made if desired of various non-laminated materials, such as paper pulp and the like, and may be molded in the shape of a hollow, cylindrical member to form a unit which may be riveted or otherwise secured to the end plates or to the peripheral portion of the web, as the case may be.

Under present conditions I prefer the construction of end members or plates shown in Figs. 9 and 10, in which these members 20 are shown as integral and having the hub receiving portions and the web portions reversely drawn from sheet metal disks. It is to be understood, however, that the hub cups may be separately made and be secured to the web in any suitable manner and the peripheral or rim engaging portion of the member may be made separately and secured to the web if desired.

It will thus be seen that I have provided a relatively simple construction of pulley which may be quickly and easily fabricated and assembled, and which is inexpensive to produce. Also, it will be seen that for a given diameter of pulley the metal end members are standard and pulleys of any desired width of face can be produced utilizing these members. It is also obvious that the hub core can be made of various lengths to correspond with the length of the rim portion.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A pulley comprising metal members having opposing hub portions formed therein, opposing web portions and alined, annular, peripheral portions connected to said web portions and adapted to receive a rim, a laminated hub core mounted between said metal hub portions, an annular, cylindrical rim secured to said peripheral portions, means disposed axially of said pulley to rigidly secure said hub portions, web portions and peripheral portions together, certain of said means passing through said metal hub and said core and certain of said means passing through said rim, said metal members being divided along an axial plane to form two rigid pulley units of substantially identical construction, and means for rigidly but detachably securing the units together about a shaft.

2. A pulley as defined in claim 1 in which the hub core is composed of laminæ disposed substantially at right angles to the axis of the pulley.

3. A pulley as defined in claim 1 in which an intermediate, reinforcing plate is disposed between said metal members and is engaged by said axially disposed securing means.

4. A pulley as defined in claim 1 in which the means for securing the units together comprises clamping members carried by the metal hub portions of said units and disposed to oppose each other along the dividing line of said pulley and on both sides of said hub portions, together with bolts passing through said clamping members.

5. A pulley comprising a pair of metal members having a pair of opposing hub portions, opposing web portions and alined peripheral portions connected to the web portions and adapted to receive a rim, an annular, cylindrical rim secured to said peripheral portions, means disposed axially of said pulley to secure said metal members together and to secure said rim to said peripheral portions, and an intermediate plate disposed between said metal members and engaged by said securing means, said metal members being divided along an axial plane to form two pulley units of substantially identical construction, and means for rigidly but detachably securing them together about a shaft.

6. The process of making pulleys which comprises assembling a laminated hub core and a laminated rim between metal end plates having portions adapted to receive a core and rim, pressing said end plates toward each other and permanently securing them in fixed relation, and dividing said metal members along an axial plane to form two rigid pulley units of substantially identical construction.

7. The process of making pulleys which comprises assembling a laminated rim of suitable predetermined length for a given width of pulley face between metal end plates having portions adapted to receive it, pressing said end plates toward each other until the face has the desired predetermined width, permanently securing said plates together in fixed relation, and dividing said metal members along an axial plane to form two rigid pulley units adapted to be clamped together about a shaft.

8. A pulley comprising two semi-circular sections, and means including a pair of opposed yokes one of which is rigidly carried by each section for rigidly but detachably securing the sections together about a shaft, each of said sections including a body formed of a pair of opposed metal members having opposing hub portions and alined peripheral portions connected to said hub portions and adapted to support a rim, an annular cylindrical rim of laminated fibrous material secured to said peripheral portions, means to secure said individual pairs of metal members together in an axial direction, and a semi-annular laminated core rigidly carried by the hub portions of each of said sections.

9. A pulley comprising two similar semi-circular sections, and means for rigidly but detachably securing said sections together about a shaft, each of said sections including a body formed of opposed metal members having opposing hub portions intermediate web portions and alined peripheral portions connected to said hub portions and adapted to support a rim, an annular laminated rim carried by the peripheral portions of said body, a semi-annular core of laminated material carried by the hub portions of said opposed metal members, said rim and core being composed of laminæ disposed substantially at right angles to the axis of the pulley, and means to secure the intermediate portions of said metal members together in an axial direction.

10. A split pulley comprising two substantially identical semi-circular sections adapted to be detachably secured together in an axial plane about a shaft, each of said sections having a metal body consisting of sheet metal members formed with a hub portion, a disc-like web portion, and an outer peripheral portion to receive a rim, a laminated rim carried directly by said web portion, and a core rigidly held within said hub having laminæ of fibrous material disposed substantially at right angles to the axis of the pulley.

In testimony whereof, I hereunto affix my signature.

WILLIAM T. HENSLEY.